Oct. 3, 1939.  C. E. BENNETT  2,174,961

ELECTRIC CABLE SYSTEM

Filed Nov. 5, 1937

INVENTOR
Charles E. Bennett
BY
Kiddle, Buthell and Montgomery.
ATTORNEYS.

Patented Oct. 3, 1939

2,174,961

UNITED STATES PATENT OFFICE 2,174,961

ELECTRIC CABLE SYSTEM

Charles E. Bennett, Ridgewood, N. J., assignor to The Okonite-Callender Cable Company, Incorporated, Paterson, N. J., a corporation of New Jersey Application November 5, 1937, Serial No. 172,975

6 Claims. (Cl. 174—11)

This invention is directed to an improved cable system for the transmission of high tension electrical energy.

While the invention is adapted for use with fluid filled cables in general it is particularly well adapted for a cable system in which the insulated unsheathed cable conductors are laid in a pipe line filled with oil under sufficiently high pressure to increase its dielectric strength. The insulated but unsheathed cable conductors are submerged in this oil and the pipe line is of such a size as compared with the spaced occupied by the insulated unsheathed cable conductors that movement of the oil on the heating and cooling cycles involved in the operation of the cable is unrestricted. The pipe line also permits the independent movement of the insulating conductors relatively to each other.

The present invention provides for the maintaining of any desired steady pressure within certain limits which is of great advantage in insuring reliable and continuous operation of the system.

The invention also provides for the control of the movement of oil in the event that the cable system should develop a leak thereby protecting the system against draining away of the oil.

In the accompanying drawing wherein I have illustrated an embodiment of my invention:

Figure 1:
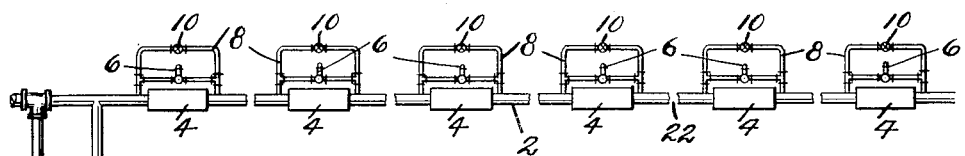
Fig. 1 is a general plan of the invention.
Figure 1:
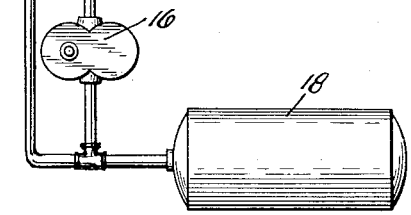

Referring to the drawing in detail: 2 designates the pipe line containing the insulated but unsheathed cable conductors. It is understood that this pipe line is maintained filled with oil under pressure, and that the line is of sufficiently large internal diameter to permit the cables to be drawn in.

4 designates stop joints along the line at desired intervals for sectionalizing the line.

At each stop joint I provide a pressure operated valve 6, shown in detail in Fig. 2 and to be described more fully hereinafter. Each of these valves is shown in a pipe by-passing the stop joint, but may be installed in the joint if desired.

Each stop joint is also by-passed by a pipe 8 equipped, for example, with a hand operated gate valve 10.

The pipe line 2 is supplied with oil through line 12. This line is equipped with a throttling device 14 which limits the flow of oil to a certain definite amount determined by the characteristics of the system.

Pressure feed pump 16 driven by a torque or automatically controlled motor to give a steady pressure takes oil from oil storage reservoir 18 and forces some past throttling device 14 to the pipe 12 and pipe line 2.

Under normal operating conditions the pressure in the system is maintained at a constant value or within a certain definite range as determined by the operating features of the pumping equipment. When a temperature change occurs, however, which may be either in the cable system due to increase or decrease of load or due to changes in atmospheric temperature, the pressure rises and falls depending on whether the cable system is being warmed up or cooled down. Under these conditions the function of the various parts of the system is as follows:

The tank 18 supplies oil to the pressure pump 16 which in turn pushes the oil through the orifice or throttling device 14 into the cable system. As the cable cools down the oil contracts thereby decreasing the pressure. The pump 16 tends to build up this pressure to its proper value. The throttling device 14 allows the oil to flow through it to the system at such a rate that the oil pressure will not drop below say 180 lbs. for any normal cooling cycle. As the cooling cycle is quite rapid upon cessation of load this device may at this time limit the oil input so that the pressure does not raise above 180 lbs. until the system starts to level off, that is, the rate of cooling has become somewhat slower, then the pressure increases gradually up to its normal value which is usually on the order of 220 lbs.

On the heating cycle the reverse is true, the pressure raises to 220 lbs., the orifice 14 being of such capacity that the pressure in the system will not go above 220 lbs. for the initial period of heating. It is to be understood, of course, that a relief valve 20 which discharges into the storage tank 18 could be employed, if desired, to take care of exceptional rises in temperature such as that caused by a short circuit on the system, which is not immediately cleared thereby causing high increase in pressure in a relatively short time.

One of the outstanding features of my invention is the provision made for protection in the event of a major catastrophe. Let us assume, for purposes of description, that the line is ruptured at the point 22. If the circuit is carrying load there is great danger of fire and other hazards due to the possible chances of the cable being short circuited at the point of failure due to the electric current. However, with my improved system much of this trouble can be eliminated. For instance, in a system which is not properly protected the oil would tend to drain to the point of failure, also the pumping plant 16 would continue to pump oil into the system until the tank 18 is completely drained.

With my improved apparatus, the pressure operated valve 6 would tend to close due to the loss of pressure on the system. Each valve at each semi-stop joint 4 would close thereby limiting the flow of oil to that small amount of leakage which will ooze through the insulation in the series of semi-stop joints. This will occur in both sides of the failure whether the system is fed from a pump or not. Once these valves are closed no additional amount of oil can be pumped through the system until repairs are made.

It is at this point where the throttling device or orifice 14 comes into action. It is possible to have a leak on a system such as this where the pumping equipment 16 is capable of maintaining a considerable flow of oil through a leak and still maintain enough pressure to keep the valves in the open position. The throttling device limits the flow of oil to a certain definite rating at a certain definite peak pressure which is the pressure of the operating plant 16. On the other side of the throttling device, if a leak is of such a nature as to be greater than the amount of oil normally required by the system, the valves 6 automatically close because the pressure, which is limited by the throttling device 14, has fallen to such a value that the valves can no longer remain in the open position.

From the above description it can be seen that any major leak which is above that of the normal flow of the insulating oil can automatically close all the valves in the entire system thereby isolating each section and reducing the pressure throughout the system to prevent further losses due to higher leakages through the various joints. This also prevents draining from one section to another due to the greater elevations of other parts of the system.

Figure 2:
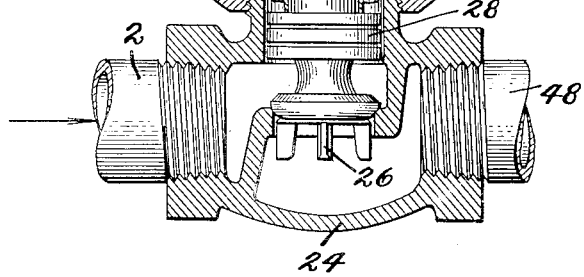
Fig. 2 is a view of one of the proposed valves which I intend to use to secure perfect operation.

With specific reference to the valve of Fig. 2. In the drawing: 24 is the valve body; 26 is the valve disc which in turn is connected to the piston-like piece 28. Soldered to the piece 28 is the bellows 30. This bellows rides in the housing 32 which is capped by the upper bellows seal 34 where the bellows is again soldered to the metal piece 46. The nut 36 holds the bellows and its connecting pieces in a liquid-tight joint so that there is no escape of insulating oil. The bellows is controlled by a spring 38 which is arranged for adjustment by means of a screw 40 and the lock nut 42. The rod 44 acts as a spring guide and the sleeve 46 limits the movement of the bellows when opening to its fullest extent.

From the above it can be seen that the piston effect is completed by the bellows and the valve seat. In operation pressure is admitted in the direction shown on the drawing. This pressure is balanced by the portions of the valve designated 26 and 28 which areas are very nearly equal so that there is no chance of opening as long as there is no pressure on the discharge side 48.

Figure 3:
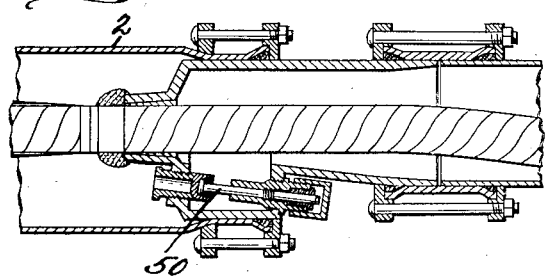
Fig. 3 shows a cut of a section of semi-stop joint showing the hand-operated valve which is used in the maintaining of the system and also in its initial operation.

Previous to the operation of these valves the line has been completely constructed and has been filled with oil through the by-pass valves 10 or through the valve arrangement 50 shown in Fig. 3 which can be made in accordance with the Meyer Patent No. 2,070,974 of February 16, 1937.

When the system has been completed and the oil is up to pressure within the line, oil enters the automatic pressure operated valve through the discharge side shown at 48 and being under pressure operates the valve disc 26 because the pressure on the valve disc is greater than the opposing thrust exerted by the spring 38 thereby causing the valve to open and equalize the pressures throughout the system.

It will be appreciated that the range of adjustment for the system is extremely variable thereby compensating for all the various factors which may be encountered in the construction and operation of such a system and also that the throttling device can be arranged to give practically any setting desired, also that the normal requirements of oil for such a system are extremely small. A pump of thirty gallons per hour capacity will take care of practically 30,000 gallons of oil distributed in such a pipe line which makes the system in itself extremely sensitive to all and various changes in pressure due to abnormal causes.

It is to be understood that changes may be made in the details of construction and arrangement of parts above described within the purview of my invention.

What I claim is:

1. An electric power transmission system comprising in combination an impervious pipe, an insulated conductor in the pipe, insulating fluid in the pipe, means for maintaining the insulating fluid under pressure, shut-off valves connected into said pipe at intervals, valve-closing means, said valves normally being maintained in open position against the action of the said valve-closing means by the total pressure on the insulating fluid, said valve closing means automatically closing the valves upon a predetermined drop in the said pressure on the insulating fluid.

2. An electric power transmission system comprising in combination an impervious pipe, an insulated conductor in the pipe, oil in the pipe, means for maintaining the oil under pressure, shut-off valves connected into said pipe at intervals, valve closing means, said valves normally being maintained in open position against the action of the said valve-closing means by the total pressure on the oil, said valve closing means automatically closing the valves upon a predetermined drop in the pressure on the oil.

3. An electric power transmission system comprising in combination an impervious pressure resistant pipe line, an insulated conductor in the pipe line, insulating fluid in the pipe line in which the insulated conductor is immersed, means for maintaining the fluid under pressure, shut-off valves connected into said pipe line at intervals, maintained in open position by the pressure on the insulating fluid, all of said valves closing automatically upon a predetermined drop in the total pressure on the system, and means intermediate the pressure supply means and the pipe line for limiting the flow of insulating fluid to the pipe line, whereby in the event of a leak in the pipe line the pressure on the insulating fluid will drop sufficiently to effect closure of the shut-off valves.

4. An electric power transmission system comprising in combination an impervious pressure resistant pipe line, an insulated conductor in the pipe line, insulating fluid in the pipe line in which the conductor is immersed, means for maintaining the fluid under pressure, shut-off valves connected into the pipe line at intervals, said valves opening as pressure is built up on the system, said valves closing automatically throughout the system in the event of a predetermined drop in the total pressure in the system to sectionalize the system and prevent the escape of insulating fluid therefrom.

5. An electric power transmission system comprising in combination an impervious pressure resistant pipe line, an insulating fluid in the pipe line, means for maintaining the fluid under pressure, shut-off valves connected into said pipe line at intervals maintained in open position by the pressure on the insulating fluid, said valves being unaffected by movement of the insulating fluid but closing automatically upon a predetermined drop of the pressure on the fluid.

6. An electric power transmission system comprising in combination an impervious pressure resistant pipe line, oil in the pipe line, means for maintaining the oil under pressure, shut-off valves connected into said pipe line at intervals and held in open position by the pressure on the oil, said valves being unaffected by oil flow conditions and permitting of variations in the pressure on the oil but closing throughout the system upon a predetermined pressure drop on the oil.

CHARLES E. BENNETT.